United States Patent
Thawani et al.

(10) Patent No.: US 10,734,876 B2
(45) Date of Patent: Aug. 4, 2020

(54) BRUSHLESS MOTOR FOR HVAC SYSTEM

(71) Applicants: DENSO International America, Inc., Southfield, MI (US); DENSO CORPORATION, Kariya, Aichi-pref. (JP)

(72) Inventors: Prakash Thawani, Bloomfield Hills, MI (US); Stephen Sinadinos, Commerce Township, MI (US); Fouad Dallal, Dearborn Heights, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 165 days.

(21) Appl. No.: 15/925,207

(22) Filed: Mar. 19, 2018

(65) Prior Publication Data

US 2019/0288590 A1    Sep. 19, 2019

(51) Int. Cl.
| H02K 21/22 | (2006.01) |
| H02K 1/27  | (2006.01) |
| H02K 1/16  | (2006.01) |
| H02K 29/03 | (2006.01) |

(52) U.S. Cl.
CPC .............. *H02K 21/22* (2013.01); *H02K 1/16* (2013.01); *H02K 1/2786* (2013.01); *H02K 29/03* (2013.01); *H02K 2213/03* (2013.01)

(58) Field of Classification Search
CPC ............ H02K 1/16; H02K 1/165; H02K 1/27; H02K 1/2786; H02K 21/22; H02K 29/03; H02K 2213/03

USPC .................................................. 310/51, 156
See application file for complete search history.

(56) References Cited

U.S. PATENT DOCUMENTS

| 4,633,149 A | 12/1986 | Welterlin |
| 5,059,875 A | 10/1991 | De Salme |
| 5,160,873 A | 11/1992 | Tukiyama et al. |
| 5,199,846 A | 4/1993 | Fukasaku et al. |
| 5,804,904 A | 9/1998 | Park et al. |
| 6,218,760 B1 | 4/2001 | Sakuragi et al. |
| 6,262,504 B1 * | 7/2001 | Bartlett .............. B60H 1/00521 310/58 |
| 6,262,510 B1 * | 7/2001 | Lungu ...................... H02K 7/14 310/216.023 |
| 6,323,570 B1 * | 11/2001 | Nishimura ................. A47L 5/28 15/392 |
| 6,759,780 B2 | 7/2004 | Liu et al. |
| 7,202,585 B2 | 4/2007 | Ohata et al. |
| 7,592,734 B2 * | 9/2009 | Enomoto ................. H02K 1/02 310/216.067 |
| 7,687,969 B2 | 3/2010 | Kim et al. |

(Continued)

FOREIGN PATENT DOCUMENTS

JP    2003284271 A    10/2003

*Primary Examiner* — Tulsidas C Patel
*Assistant Examiner* — Rashad H Johnson
(74) *Attorney, Agent, or Firm* — Harness, Dickey & Pierce, P.L.C.

(57) ABSTRACT

A brushless motor for a heating, ventilation, and air conditioning (HVAC) system. The brushless motor includes a rotor and a stator. The rotor has an odd number (X) of magnets. The stator defines an odd number (Y) of slots, each including a plurality of fractional-pitch phase windings. The brushless motor has a fundamental order that is $(X \cdot Y)/2$, which is a non-integer number.

20 Claims, 2 Drawing Sheets

(56) References Cited

U.S. PATENT DOCUMENTS

Figure 1:
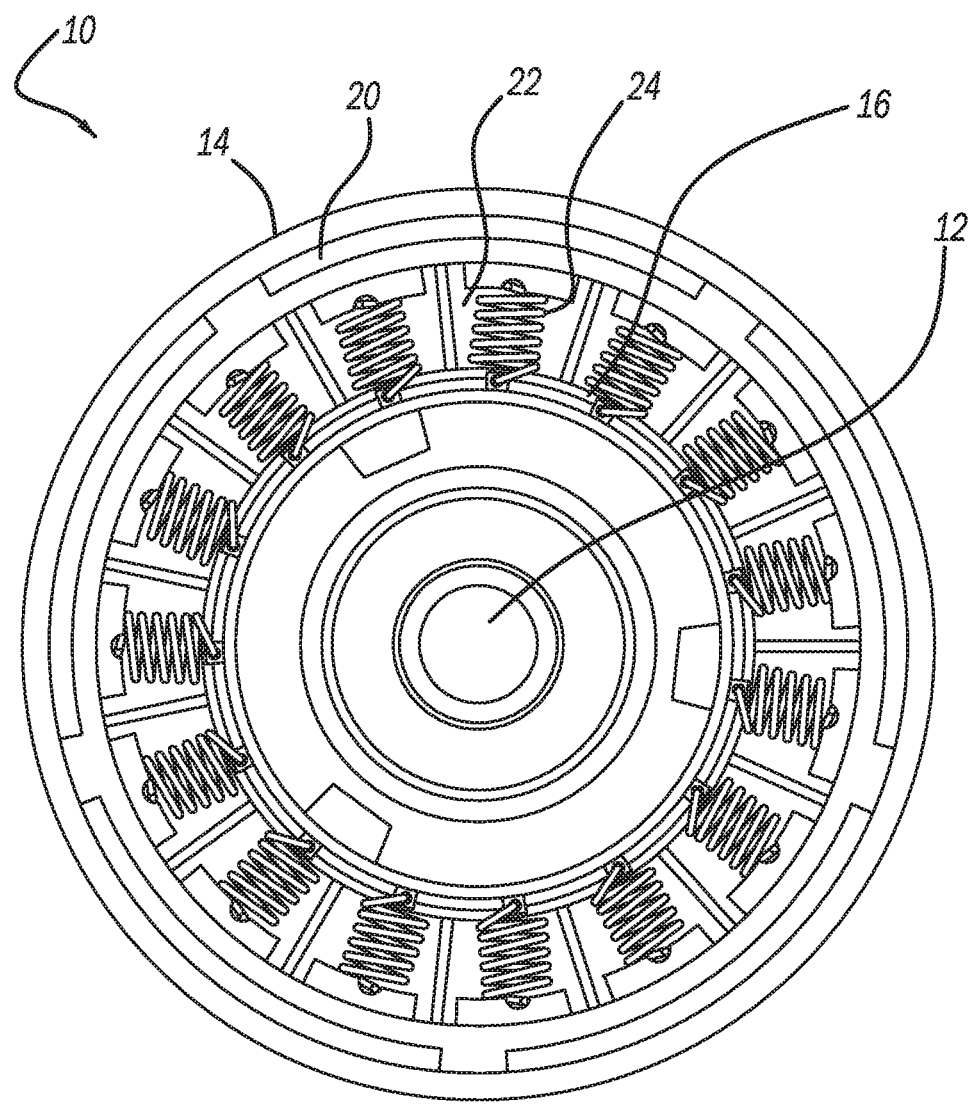

| | | | |
|---|---|---|---|
| 7,928,622 B2 | 4/2011 | Okubo | |
| 8,134,266 B2* | 3/2012 | Li | H02K 29/03 |
| | | | 310/112 |
| 8,493,010 B2 | 7/2013 | Rote et al. | |
| 8,519,593 B2 | 8/2013 | Suzuki et al. | |
| 9,698,636 B2 | 7/2017 | Matsuoka | |
| 9,742,323 B2 | 8/2017 | Miyauchi | |
| 2001/0030471 A1* | 10/2001 | Kanebako | F16C 32/0465 |
| | | | 310/90.5 |
| 2006/0087186 A1 | 4/2006 | Wasson et al. | |
| 2006/0192511 A1 | 8/2006 | Kataoka et al. | |
| 2008/0001483 A1* | 1/2008 | Kitamura | H02K 41/03 |
| | | | 310/12.04 |
| 2008/0303370 A1* | 12/2008 | Rahman | H02K 1/165 |
| | | | 310/179 |
| 2009/0224621 A1 | 9/2009 | Okubo et al. | |
| 2009/0236920 A1 | 9/2009 | Islam et al. | |
| 2011/0068649 A1* | 3/2011 | Chai | H02K 5/10 |
| | | | 310/90 |
| 2013/0099707 A1 | 4/2013 | Okubo | |
| 2014/0300212 A1* | 10/2014 | Hoshi | H02K 3/18 |
| | | | 310/12.21 |
| 2015/0054440 A1 | 2/2015 | Dernebo | |
| 2015/0303780 A1 | 10/2015 | Kim et al. | |
| 2015/0349595 A1 | 12/2015 | Jiang et al. | |
| 2016/0197541 A1 | 7/2016 | Okubo et al. | |
| 2017/0288517 A1 | 10/2017 | Ikeno et al. | |

* cited by examiner

BRUSHLESS MOTOR FOR HVAC SYSTEM

FIELD

The present disclosure relates to a brushless motor for a heating, ventilation, and air conditioning system.

BACKGROUND

This section provides background information related to the present disclosure, which is not necessarily prior art.

Brushless motors are commonly used for a variety of industrial and consumer products, such as automotive related products, in particular blower motors for heating, ventilation, and air conditioning (HVAC) systems. Brushless motors have replaced conventional DC brush motors for a variety of reasons. One of the main reasons is to avoid and eliminate the common excitation of brush noise that is induced due to contact and sliding of the brushes and commutator slots. The use of a brushless motor eliminates the brush noise, which is usually tonal (slot passing frequency corresponding to the number of slots on the commutator), as well as high frequency ticking/grinding noise.

Typical brushless motors have an odd number of magnets (m) and an even number of slots (s) on a stator and rotor or vice versa. As a result, current brushless motors can generate major magnetic harmonics at orders corresponding to (m·s)/2, and minor sub-harmonics at multiples of m (e.g., if m=5 and n=10, major audible harmonics may be excited at $(5 \cdot 10)/2=25^{th}$ order of the rotational speed of the motor.

A brushless motor that suppresses this dominant harmonic would therefore be desirable. The present disclosure advantageously provides for such a brushless motor, which has dominant harmonics at higher orders, which are masked (inaudible) by the blower.

Current brushless motors experience dominant (audible) orders/tones at certain rotational speeds, relatively low blower speeds when the air-rush noise that usually masks blower-induced noise is minimal. The most dominant/audible tone (order) occurs at (m·n)/2 order. With current brushless motors, the product of (m·n) is an even number, and the order occurs at an integer number. This order gets further amplified when coincident with HVAC system resonances. For example, for existing brushless motors where m=4 and n=6, the dominant order is (4·6)/2=12. For current motors where m=8 and n=6, the dominant order is (8·6)/2=24. For current brushless motors where m=5 and n=6, the dominant order is (5·6)/2=15. Such dominant orders are undesirably audible because they are not masked by the air-rush noise of the blower due to the relatively low frequency and high energy of the orders. A brushless motor that generates relatively high frequency orders with relatively less energy would therefore be desirable because such orders will be masked by the noise of the blower and advantageously be inaudible.

SUMMARY

This section provides a general summary of the disclosure, and is not a comprehensive disclosure of its full scope or all of its features.

The present disclosure includes a brushless motor for a heating, ventilation, and air conditioning (HVAC) system. The brushless motor includes a rotor and a stator. The rotor has an odd number (X) of magnets. The stator defines an odd number (Y) of slots, each including a plurality of fractional-pitch phase windings. The brushless motor has a fundamental order that is (X·Y)/2, which is a non-integer number.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 2:
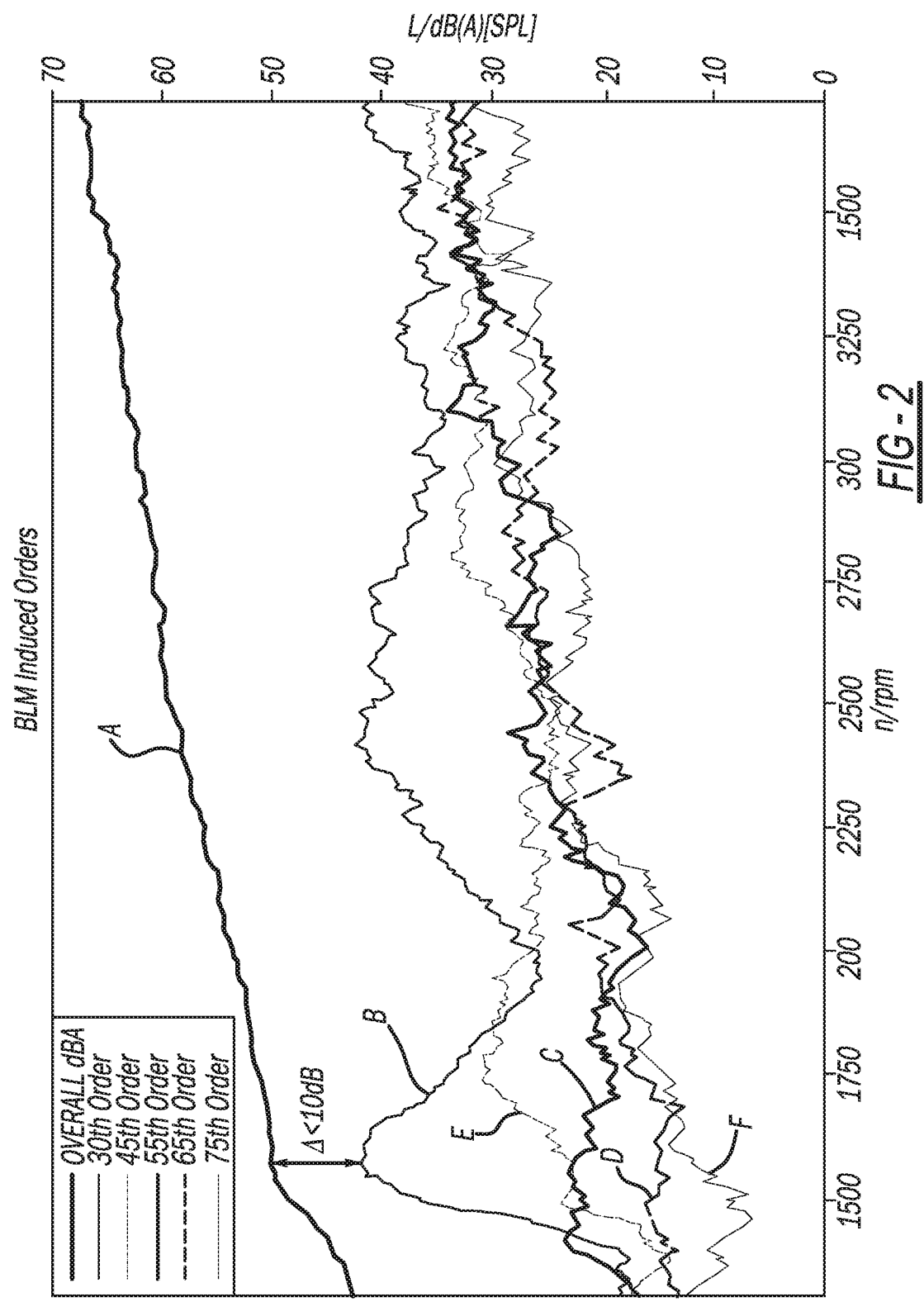

FIG. 1 illustrates an exemplary brushless motor in accordance with the present disclosure; and FIG. 2 illustrates exemplary orders of brushless motors in accordance with the present disclosure, as well as an exemplary order of a prior art brushless motor, relative to overall noise generated by an exemplary blower.

Corresponding reference numerals indicate corresponding parts throughout the several views of the drawings.

DETAILED DESCRIPTION

Example embodiments will now be described more fully with reference to the accompanying drawings.

FIG. 1 illustrates an exemplary brushless motor in accordance with the present disclosure at reference numeral 10. The brushless motor 10 can be used with any suitable device, such as a blower of a heating, ventilation, and air conditioning (HVAC) system, particularly a vehicle HVAC system. The brushless motor 10 generally includes a shaft 12, a rotor 14, and a stator 16. The rotor 14 includes a plurality of magnets 20. The stator 16 defines a plurality of slots 22. Each one of the slots 22 includes fractional-pitch phase windings.

Unlike current brushless motors, the brushless motor 10 according to the present disclosure has an odd number (X) of magnets 20, and an odd number (Y) of slots 22. Existing brushless motors have an even number of slots and odd number of magnets (or vice versa), which results in the generation of low frequency/high energy orders, which are undesirably audible, particularly at low blower speeds and sometimes at higher blower speeds. By having an odd number (X) of magnets 20 and an odd number (Y) of slots 22, the brushless motor 10 of the present disclosure advantageously generates relatively higher dominant orders, which are generally inaudible, and/or readily masked by the high frequency air rush noise.

The brushless motor 10 can have any suitable number of magnets 20, such as five magnets 20 or seven magnets 20. The motor 10 can also have any suitable number of odd slots 22, such as 9, 11, 13, 15, or 27 slots 22. Table 1 below lists the fundamental orders for an exemplary rotor 14 having five magnets 20, and 9, 11, 13, 15, or 27 slots 22. Table 1 also lists the fundamental orders for an exemplary rotor 14 having seven magnets 20, and 9, 11, 13, 15, or 27 slots 22. Stators with 9, 15, 21, 27, 33 and so on . . . slots advantageously can be mechanically balanced in three phases.

The fundamental order is calculated based on: (X*Y)/2. As set forth in Table 1, each one of the fundamental orders of the brushless motor 10 is a non-integer. Thus the corresponding dominant order, which is twice the fundamental order, is higher than the dominant orders of current brushless motors having an even number of slots or magnets. The relatively higher dominant orders of the motor 10 have a higher frequency and less energy as compared to orders of current brushless motors. As a result, the dominant orders of the motor 10 are higher and advantageously inaudible.

TABLE 1

| NO. OF ROTOR MAGNETS (X) | NO. OF STATOR SLOTS (Y) | FUNDAMENTAL ORDER (X · Y)/2 | DOMINANT ORDER |
|---|---|---|---|
| 5 | 9 | $22.5^{th}$ | $45^{th}$ |
| 5 | 11 | $27.5^{th}$ | $55^{th}$ |
| 5 | 13 | $32.5^{th}$ | $65^{th}$ |
| 5 | 15 | $37.5^{th}$ | $75^{th}$ |
| 5 | 27 | $67.5^{th}$ | $135^{th}$ |
| 7 | 9 | $31.5^{th}$ | $63^{rd}$ |
| 7 | 11 | $38.5^{th}$ | $77^{th}$ |
| 7 | 13 | $45.5^{th}$ | $91^{st}$ |
| 7 | 15 | $52.5^{th}$ | $105^{th}$ |
| 7 | 27 | $94.5^{th}$ | $189^{th}$ |

FIG. 2 illustrates the amount of noise generated by a typical vehicle HVAC blower at various speeds at line A. A $30^{th}$ order generated by a current brushless motor with 5 magnets and 12 stator slots at various motor speeds is illustrated at reference letter B. At low speeds, such as at about 1600 rpm, the $30^{th}$ order of the exemplary existing brushless motor is only about 10 dB (or less) lower than the overall decibel level A of the exemplary blower motor. This is undesirable because typically such a difference of 10 dB is not significant enough for the $30^{th}$ order B of the existing brushless motor to be masked by the overall noise generated by the blower represented by line A. The $30^{th}$ order at line B is audible generally because the $30^{th}$ order B has a low frequency and high energy.

Line C of FIG. 2 illustrates an exemplary $55^{th}$ order generated by a brushless motor 10 according to the present disclosure having a rotor 14 with an odd number (X) of magnets 20 equal to 5, and a stator 16 defining an odd number (Y) of slots 22 equal to 11, which results in a $27.5^{th}$ fundamental order and a $55^{th}$ dominant order. Line D of FIG. 2 illustrates an exemplary $65^{th}$ order of a brushless motor 10 according to the present disclosure having a rotor 14 with an odd number (X) of magnets 20 equal to 5, and a stator 16 defining an odd number (Y) of slots 22 equal to 13. Lines E and F of FIG. 2 illustrate an exemplary 45th order and an exemplary 75th order respectively of brushless motors 10 according to the present disclosure having a rotor 14 with an odd number (X) of magnets 20, and a stator 16 defining an odd number (Y) of slots 22.

The delta between the overall decibel level A and the 30th order at line B is a minimum, thus the 30th order dominates and contributes most to the overall dBA at line A. Whereas with all the higher orders generated by using a combination of odd number of slots and odd number of magnets in accordance with the present disclosure, the delta dBA is larger, and hence only slightly audible and not annoying. In addition, it will easily get masked by the higher air-rush noise at higher blower RPMs unlike the 30th order, which is enhanced due to its generation at 1,600 RPM and its coincidence with any of the HVAC system resonances, such as but not limited to an 800 Hz HVAC system resonance.

As illustrated in FIG. 2, the $55^{th}$ order at line C, the $65^{th}$ order at line D, the $45^{th}$ order at line E, and the $75^{th}$ order at line F, have a relatively higher frequency, and less energy, as compared to the $30^{th}$ order B. Thus the difference between the overall noise level of the exemplary blower at line A and each of the $55^{th}$ order at line C, the $65^{th}$ order at line D, the $45^{th}$ order at line E, and the $75^{th}$ order at line F is far greater than 10 dB, such as about 30 dB. The $55^{th}$, $65^{th}$, $45^{th}$, and $75^{th}$ orders generated by the exemplary brushless motors 10 according to the present disclosure are generally masked by the overall sound generated by the blower (line A), thus making the orders of the brushless motor 10 advantageously inaudible or less annoying. FIG. 2 thus illustrates the difference in frequency and amplitude between the $30^{th}$ order of the exemplary existing brushless motor and each of the $55^{th}$, $65^{th}$, $45^{th}$ and $75^{th}$ orders of the brushless motor 10 according to the present disclosure. FIG. 2 shows that the $30^{th}$ order has a lower frequency and amplitude as compared to the $55^{th}$, $65^{th}$, $45^{th}$, and $75^{th}$ orders. In addition, the $30^{th}$ order readily coincides with the HVAC system resonances at lower frequencies, making it louder.

The present teachings thus advantageously provide for a brushless motor 10 having a rotor 14 with an odd number (X) of magnets 20, and a stator 16 defining an odd number (Y) of slots 22. The motor 10 has a fundamental order that is equal to (X·Y)/2, which is a non-integer number. As a result, the corresponding dominant order will be higher than the dominant orders of existing brushless motors with an even number of slots. The higher dominant orders of the brushless motors 10 according to the present disclosure are advantageously inaudible because the higher dominant orders have a relatively higher frequency than, and relatively lower energy than, existing brushless motors having an even number of slots. Noise generated by the brushless motor 10 is thus advantageously masked by the overall noise generated by the associated blower. The high frequency orders of the brushless motors 10 in accordance with the present disclosure have relatively less energy as compared to existing brushless motors, thus making the brushless motors 10 of the present disclosure advantageously quieter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A brushless motor for a heating, ventilation, and air conditioning (HVAC) system, the brushless motor comprising:
   a rotor having an odd number (X) of magnets; and
   a stator defining an odd number (Y) of slots each including a plurality of fractional-pitch phase windings;
   wherein the brushless motor has a fundamental order that is (X·Y)/2, which is a non-integer number, resulting in the brushless motor having a dominant order that is at least partially masked by noise generated by a blower associated with the brushless motor.

2. The brushless motor of claim 1, wherein the rotor has 5 magnets.

3. The brushless motor of claim 2, wherein the stator has 9 slots, the fundamental order is [(5·9)/2] 22.5th, and the dominant order is 45th order.

4. The brushless motor of claim 2, wherein the stator has 11 slots, the fundamental order is [(5·11)/2] 27.5th, and the dominant order is 55th order.

5. The brushless motor of claim 2, wherein the stator has 13 slots, the fundamental order is [(5·13)/2] 32.5th, and a fundamental frequency is 65th order.

6. The brushless motor of claim 2, wherein the stator has 15 slots, the fundamental order is [(5·15)/2] 37.5th, and a fundamental frequency is 75th order.

7. The brushless motor of claim 2, wherein the stator has 27 slots, the fundamental order is [(5·27)/2] 67.5th, and a fundamental frequency is 135th order.

8. The brushless motor of claim 1, wherein the rotor has 7 magnets.

9. The brushless motor of claim 8, wherein the stator has 9 slots, the fundamental order is [(7·9)/2] 31.5th, and a fundamental frequency is 63rd order.

10. The brushless motor of claim 8, wherein the stator has 11 slots, the fundamental order is [(7·11)/2] 38.5th, and a fundamental frequency is 77th order.

11. The brushless motor of claim 8, wherein the stator has 13 slots, the fundamental order is [(7·13)/2] 45.5th, and a fundamental frequency is 91st order.

12. The brushless motor of claim 8, wherein the stator has 15 slots, the fundamental order is [(7·15)/2] 52.5th, and a fundamental frequency is 105th order.

13. The brushless motor of claim 8, wherein the stator has 27 slots, the fundamental order is [(7·27)/2] 94.5th, and a fundamental frequency is 189th order.

14. The brushless motor of claim 1, wherein half the product of the odd number of magnets and the odd number of slots is a non-integer.

15. The brushless motor of claim 1, wherein the fundamental order is a lowest integer frequency of a harmonic order.

16. The brushless motor of claim 1, wherein the fundamental order is a first harmonic of an integer number.

17. The brushless motor of claim 1, further comprising the HVAC system including the brushless motor.

18. A heating, ventilation, and air conditioning (HVAC) system comprising:
   a brushless motor;
   a rotor of the brushless motor having an odd number (X) of magnets; and
   a stator of the brushless motor defining an odd number (Y) of slots each including a plurality of fractional-pitch phase windings;
   wherein the brushless motor has a fundamental order that is (X·Y)/2, which is a non-integer number, resulting in the brushless motor having a dominant order that is at least partially masked by noise generated by a blower associated with the brushless motor; and
   wherein the fundamental order is a lowest integer frequency of a harmonic order.

19. The HVAC system of claim 18, wherein the rotor has 5 magnets or 7 magnets.

20. The HVAC system of claim 18, wherein the stator has 9, 11, 13, 15, or 27 slots.

* * * * *